United States Patent [19]

Lethellier

[11] Patent Number: 4,654,538
[45] Date of Patent: Mar. 31, 1987

[54] DUAL INPUT VOLTAGE POWER SUPPLY

[75] Inventor: Patrice R. Lethellier, Tamarac, Fla.

[73] Assignee: Burroughs Corporation, Detroit, Mich.

[21] Appl. No.: 667,953

[22] Filed: Nov. 5, 1984

[51] Int. Cl.$^4$ .................................. H02M 5/00
[52] U.S. Cl. .................................. 307/75; 307/130; 363/143; 323/299
[58] Field of Search ............... 307/23, 25, 65, 28, 307/64, 75, 130, 131, 151; 363/142, 143; 307/109, 110; 323/299

[56] References Cited

U.S. PATENT DOCUMENTS 3,713,018  1/1973  Tscheuschner .................. 363/143
3,900,787  8/1975  Köster ............................. 363/143 X
4,241,399 11/1980  Ikawa ............................. 307/130 X Primary Examiner—A. D. Pellinen
Assistant Examiner—T. DeBoer
Attorney, Agent, or Firm—Francis A. Varallo; Kevin R. Peterson

[57] ABSTRACT

A power supply circuit including A.C. input of either 110 volts or 220 volts coupled to a full diode bridge, across the output of which are provided series connected capacitors across which the desired system operating voltage appears. A voltage-controlled current generator for driving a diac and triac is connected between the input supply and the bridge capacitors. At 110 volt input, the current generator closes the triac and the circuitry operates as a voltage doubler to provide the desired system voltage. At 220 volt input, the triac remains open, and the full bridge and capacitors provide the same desired system voltage.

9 Claims, 4 Drawing Figures

DUAL INPUT VOLTAGE POWER SUPPLY

BACKGROUND OF THE INVENTION

At the present time, many power supplies are designed to operate on both 110 volt and 200 volt power supplies as their input. However, to so operate, the power supply is provided at its input with a removable strap which is switched into operation for one supply and is removed for the other supply. This is an undesirably expensive and awkward arrangement to manipulate.

The present invention provides a simple and inexpensive circuit arrangement for permitting a power supply to operate properly and automatically whether the input supply voltage is 110 volts or 220 volts. The circuit arrangement includes a voltage-controlled current generator which acts like a variable negative resistor coupled to a diac and triac.

DESCRIPTION OF THE INVENTION

Figure 1:
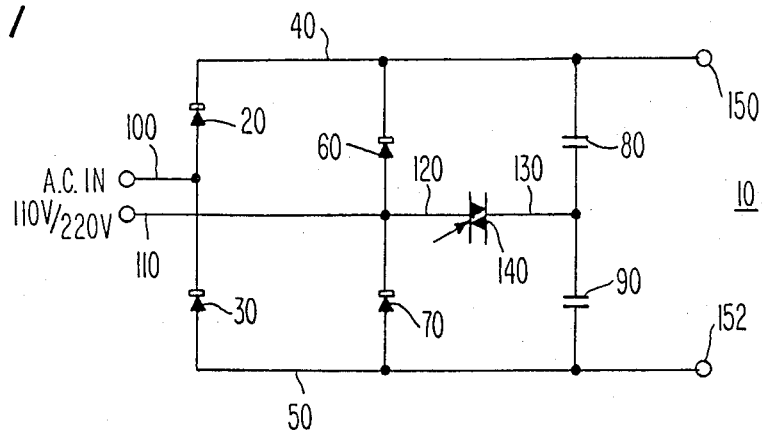
FIG. 1 is a schematic representation of a circuit illustrating the principles of the invention.

The principles of the invention may be incorporated in substantially any power supply which has the problem solved by the present invention, and which would normally include a strap arrangement for adapting the supply for 110 or 220 volt input operation. The principles of the invention are first described broadly with respect to the circuit 10 shown in FIG. 1, which is the input portion of a power supply and includes a full diode bridge comprising pairs of diodes 20,30 and 60,70. The input voltage, either 110 or 220 volts, is connected by leads 100 and 110 to two opposite corners of the diode bridge, and leads 40 and 50 are connected to the other two opposite corners of the bridge. In addition, two capacitors 80 and 90 are connected in series between leads 40 and 50. A lead 120 is also connected to the junction of diodes 60 and 70, and a lead 130 is connected to the junction of capacitors 80 and 90, and, according to the invention, a triac 140 is connected between the leads 120 and 130. Output terminals 150 and 152 represent connections to other circuitry of a power supply which receives the required operating voltage. The triac is comparable to the strap in a prior art power supply.

In operation of the circuit 10, if 110 volts is applied to the circuit at leads 100 and 110, then the triac 140 is shorted and the circuit operates properly with the 110 volt input. If 200 volts is applied, then the triac opens and the circuit again operates properly and provides the required internal operating potential for the power supply.

Figure 2:
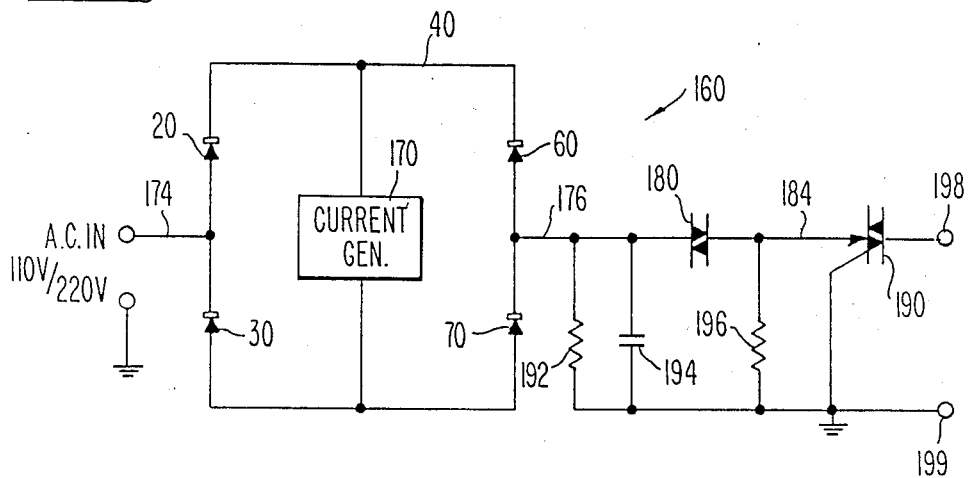
FIG. 2 is a schematic representation of another circuit illustrating the invention.

Another circuit 160, embodying the invention, is shown in FIG. 2 and includes the full diode bridge, as in FIG. 1. According to the invention, a voltage-controlled current generator 170 is connected between leads 40 and 50. The junction of bridge diodes 60 and 70 is connected by lead 176 to one side of a diac 180, the other side of which is connected by lead 184 to the input of a triac 190. A parallel resistor 192 and capacitor 194 are connected to one side of the diac 180 and to lead 199, and a resistor 196 is connected between the other side of the diac and lead 199. The desired system operating voltage appears between lead 198 at the output of triac 190 and lead 199.

Figure 3:
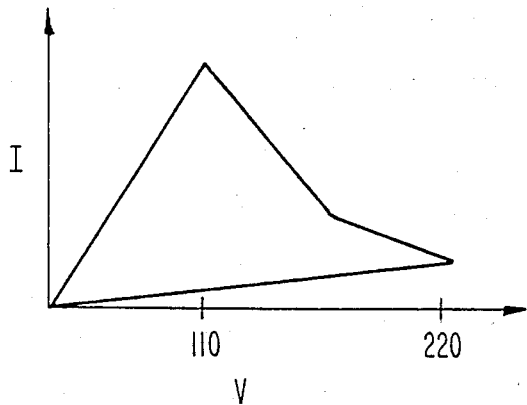
FIG. 3 is a curve of voltage and current which appears in the circuit of the invention.

The voltage-current characteristic for a voltage-controlled current generator is shown in FIG. 3, and it can be seen that it provides a high current at low applied voltage and a low current at high applied voltage, and it is inhibited during the time the applied voltage is decreasing.

In operation of the circuit 160 of FIG. 2, at low input voltage, the current is large and charges the capacitor 194, and when the threshold of the diac is reached, the triac fires, and the circuit is in the 110 volt configuration. At high applied input voltage, the current flow is small out of the current generator 170, the capacitor 194 does not charge to the threshold of the diac 180, and the triac 190 is not fired, and the circuit is in the 220 volt configuration.

Figure 4:
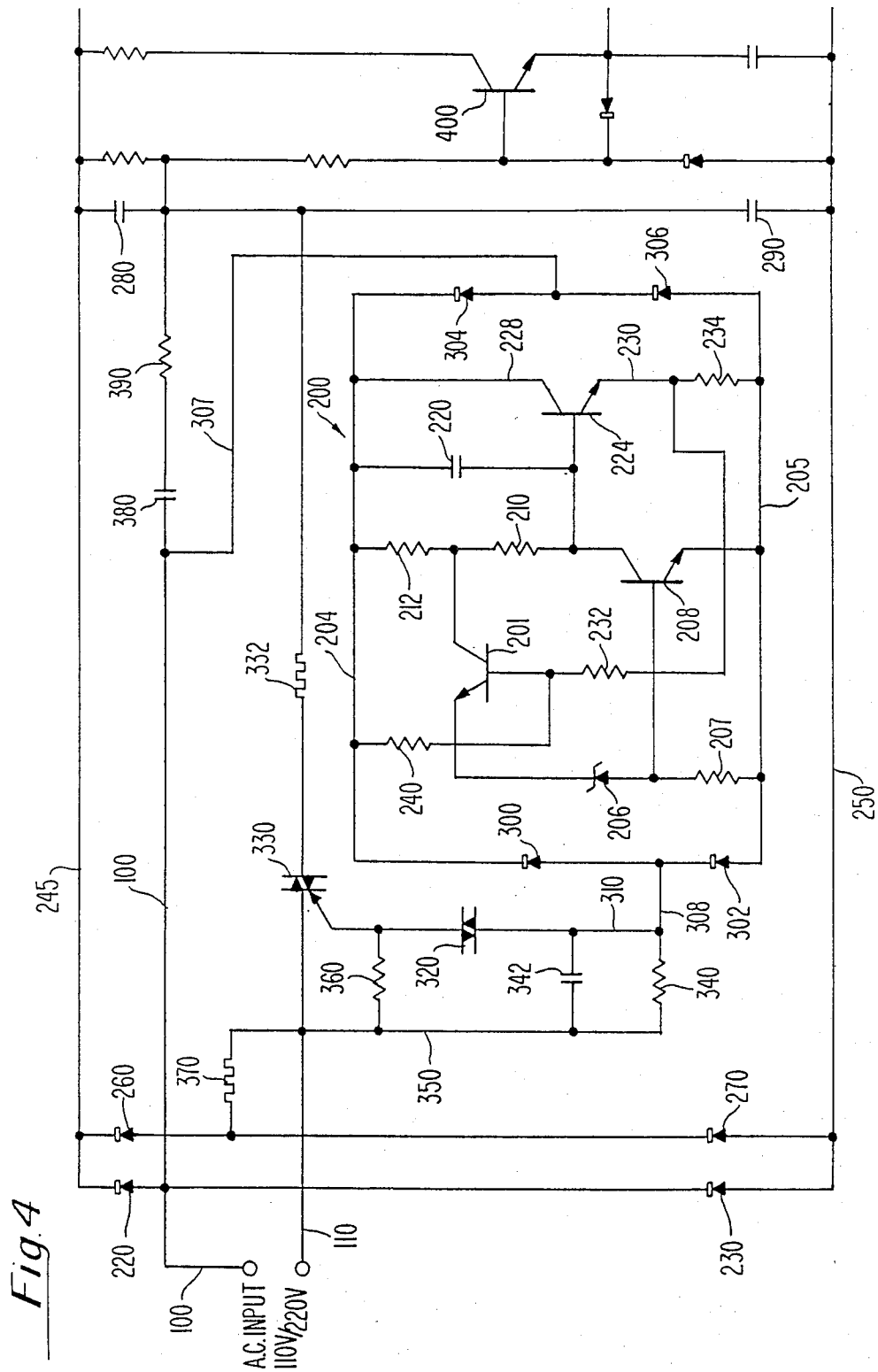
FIG. 4 is a schematic representation of another circuit embodying the invention.

The circuit of FIG. 4 shows the input portion of a typical power supply such as that shown in FIG. 1 with a more detailed current generator circuit 200 for permitting the power supply to operate on 110 volts or 220 volts. The circuit of FIG. 4 includes a diode bridge made up of diodes 220, 230 and 260,270 connected between leads 245 and 250 and capacitors 280 and 290 connected between leads 245 and 250. This bridge provides the desired D.C. power for the rest of the power supply, whether the input is 110 volt A.C. or 220 volt A.C.

The circuit 200 includes buses 204 and 205 and an NPN transistor 201 which has its emitter connected through a Zener diode 206 (oriented as shown) and a resistor 207 to bus 205. The collector of transistor 201 is connected to the junction of resistors 212 and 210, the other end of resistor 212 being connected to bus 204, and the other end of resistor 210 being connected both to the collector of NPN transistor 208 and to the base of NPN transistor 224. The base of transistor 201 is connected through resistor 232 to the emitter of transistor 224 and through lead 230 and resistor 234 to bus 205. The base of transistor 201 is also connected through resistor 240 to bus 204. The emitter of transistor 208 is connected to bus 205 and the base of transistor 224 and collector of transistor 208 are connected together and through capacitor 220 to bus 204.

The collector of transistor 224 is connected by lead 228 to bus 204. Series diodes 300 and 302 are connected between buses 204 and 205, and series diodes 304 and 306 are connected between buses 204 and 205. These diodes are a full bridge which provides D.C. power for the current generator circuit 200.

The junction of diodes 300,302 is connected by leads 308 and 310 to the input of a diac 320, the output of which is connected to the input of a triac 330. The output of the triac 330 is connected through a surgistor 332 to the junction of the capacitors 280 and 290. The input of the diac 320 is also connected through parallel resistor 340-capacitor 342 to a lead 350, and the output of the diac 320 is connected through a resistor 360 to the lead 350 which runs through a surgistor 370 to the junction of input bridge diodes 260 and 270. The junction of diodes 304 and 306 is coupled by lead 307 to input lead 100.

The circuit input lead 110 is connected to the input of triac 330, and input lead 100 is connected through a series capacitor 380 and resistor 390 to the junction of capacitors 280 and 290 which provide holding current for the triac 330. The circuit shown in FIG. 4 may also include conventional parts of a power supply, for example, circuitry including NPN transistor 400 for generating a supply voltage for use in the circuit. This portion of the circuit may be the same as that shown in application Ser. No. 649,071, filed by P. R. Lethellier entitled "Base Drive Circuit for a Switching Power Transistor" now U.S. Pat. No. 4,595,974.

In operation of the circuit of FIG. 4 and, in particular, circuit 200, the three transistors 201, 208, and 224 operate in linear fashion and are neither full on or full off. These transistors generate current which generates the voltage across resistors 232 and 240 which is compared to the reference Zener diode 206 by the transistor 201. The two other transistors 208 and 224 operate as amplifiers.

At 110 volt A.C. input line voltage, the total voltage across resistors 232 and 240 is small, so to reach the voltage of the reference diode 206, the transistor 201 generates a high current. This current charges capacitor 342 fully on one half cycle of the input A.C., to a voltage which reaches the threshold of the diac 320, and this fires the triac 330. The triac is conductive (and acts like a strap in the prior art), input lead 110 is connected to the junction of capacitors 280 and 290, and the circuit is in voltage doubler mode. This arrangement provides the desired internal voltage for the rest of the power supply.

At 220 volt A.C. input, the total voltage across resistors 232 and 240 is large, and transistor 201 passes a small current into the capacitor 342. But now the capacitor is not fully charged in one half cycle of the input A.C., and the threshold of the diac is not reached, and the triac does not fire, but remains open. Now, the circuit is operated with the full rectifier bridge functioning, without voltage doubling, and again the desired internal system voltage is provided.

In summary, with continued reference to FIG. 4, the present invention provides a power supply input circuit which includes a pair of diode bridges. A first of these bridges associated exclusively with current generator 200, is comprised of diodes 300,302,304 and 306. First and second input terminals for the last mentioned bridge appear at the respective junctions of diodes 304,306 and 300,302. First and second output terminals for the first diode bridge are at the respective junctions of diodes 300,304 (at line 204) and 302,306 (at line 205).

A second diode bridge associated with the rest of the power supply includes diodes 220,230,260 and 270. First and second input terminals for the second diode bridge appear at the respective junctions of diodes 220,230 and 260,270—first and second output terminals, at respective junctions of diodes 220,260 and 230,270.

Current generator 200 comprised of first, second and third transistors, 224,208 and 201 respectively provides a reliable and effective drive for the circuit combination of capacitor 342, diac 320 and triac 330. Instant automatic switching of substantial power levels is effected by the circuit of FIG. 4, as described in detail hereinbefore.

What is claimed is:

1. A power supply circuit providing automatic operation selectively at first and second levels of an AC supply voltage comprising:

first and second supply terminals for receiving at any given time said AC supply voltage at one of said levels, a first diode bridge having first and second bridge input terminals and first and second bridge output terminals, said first bridge input terminal being coupled to said first supply terminal, capacitive means coupling said second bridge input terminal to said second supply terminal, voltage-controlled current generator means coupled between said first and second bridge output terminals, said current generator means being operatively coupled to said capacitive means for charging the latter means to a voltage level which is an inverse function of said first and second levels of said AC supply voltage, switching means operatively coupled to said second bridge input terminal, said switching means being disposed in a circuit path and being responsive to the voltage charge on said capacitive means for establishing a closed-circuit condition in said path in the presence of an AC supply voltage of said first level and an open-circuit condition in said path for an AC supply voltage of said second level.

2. The power supply circuit as defined in claim 1 characterized in that said switching means includes a triac having a pair of terminal electrodes and a gate electrode, a diac having first and second terminal electrodes coupled respectively to said second bridge input terminal and said gate electrode of said triac, the voltage charge on said capacitor means being applied to said first terminal electrode of said diac, whereupon the attainment of a voltage on said capacitive means in excess of a predetermined threshold voltage for said diac causes a voltage to be applied to the gate electrode of said triac for causing the latter to fire and to assume a conducting state.

3. A power supply circuit as defined in claim 2 further including a second diode bridge having first and second bridge input terminals and first and second bridge output terminals, said first and second bridge input terminals of said second diode bridge being coupled respectively to said first and second supply terminals, a pair of series connected capacitors coupled between said first and second bridge output terminals of said second diode bridge, said triac having its terminal electrodes coupled respectively to said second supply terminal and to the junction of said series connected capacitors, whereby when said triac is in said closed-circuit condition, voltage-doubling is effected as to the DC voltage present across said first and second bridge output terminals of said second diode bridge, and when said triac is in said open-circuit condition, said DC voltage is that normally present across said series-connected capacitors.

4. A power supply circuit as defined in claim 3 further including a series connected resistor and capacitor interposed between said first supply terminal and said junction of said series connected capacitors for providing holding current for said triac.

5. A power supply circuit as defined in claim 4 wherein said voltage-controlled current generator comprises first, second and third transistors, each of said transistors having an emitter, a collector and a base, resistive means coupling the emitter of said first transistor to said second bridge output terminal of said first diode bridge, the collector of said first transistor being connected to said first bridge output terminal of said first diode bridge, the emitter of said second transistor being connected to said second bridge output terminal of said first diode bridge, the collector of said second transistor being coupled to said first bridge output terminal of said first diode bridge by a pair of series resistors in parallel with a capacitor, the base of said first transistor being connected to the collector of said second transistor, the emitter of said third transistor being coupled by way of a Zener diode to the base of said second transistor, the base of said second transistor being coupled to said second bridge output terminal of said first diode bridge, the collector of said third transistor being connected to the jucntion of said pair of series resistors in parallel with a capacitor, and resistive means coupling the base of said third transistor in common to said first bridge output terminal of said first diode bridge and the emitter of said first transistor, said third transistor supplying current to charge said capacitive means.

6. A power supply circuit as defined in claim 5 wherein said current provided by said third transistor fully charges said capacitive means in one half cycle of said AC voltage at said first level, and only partially charges said capacitive means when said AC supply voltage is at said second level.

7. A power supply circuit as defined in claim 6 further including a pair of resistors coupling respectively said first and second terminal electrodes of said diac to said second supply terminal.

8. A power supply circuit as defined in claim 7 further characterized in that said first, second and third transistors are all of the NPN conductivity type.

9. A power supply circuit as defined in claim 8 further characterized in that the first level of said AC supply voltage is substantially 110 voltas and the second level is substantially 220 volts.

* * * * *